Figure 3:
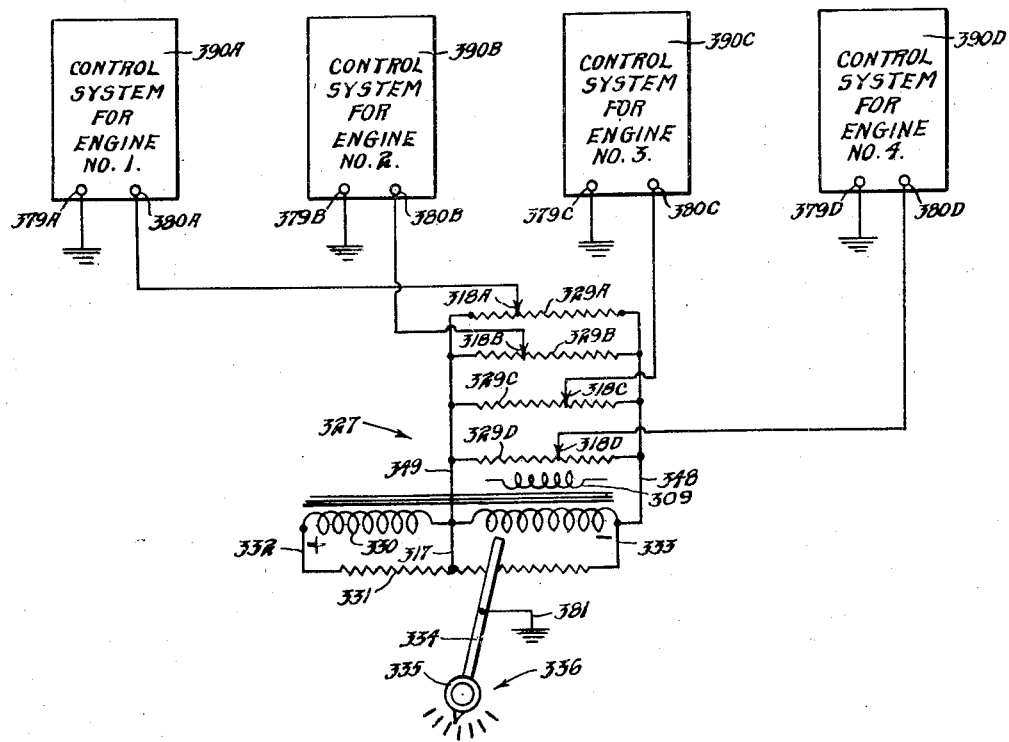

April 5, 1949.   H. T. SPARROW ET AL   2,466,282
ELECTRICAL NETWORK MOTOR CONTROL APPARATUS
Filed May 14, 1943   2 Sheets-Sheet 1

Inventors
HUBERT T. SPARROW
ROBERT J. KUTZLER
By George H. Fisher
Attorney

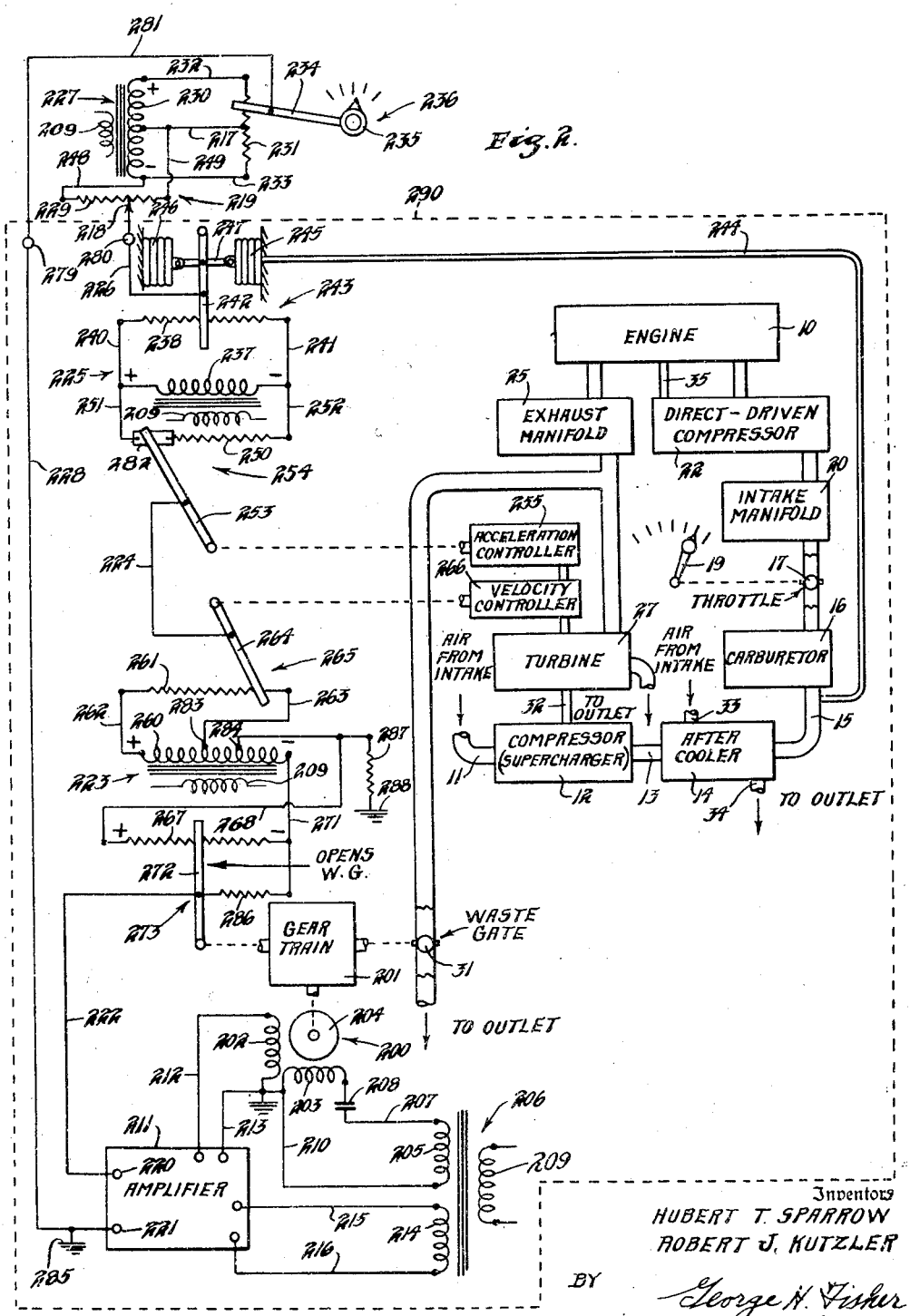

Patented Apr. 5, 1949

2,466,282

UNITED STATES PATENT OFFICE 2,466,282

ELECTRICAL NETWORK MOTOR CONTROL APPARATUS

Hubert T. Sparrow and Robert J. Kutzler, Minneapolis, Minn., assignors to Minneapolis-Honeywell Regulator Company, Minneapolis, Minn., a corporation of Delaware Application May 14, 1943, Serial No. 486,992

9 Claims. (Cl. 60—97)

This invention relates to electrical control systems, and particularly to electrical control systems wherein a load device is controlled in accordance with the resultant of a plurality of controlling conditions.

The invention is disclosed herein in connection with a system for controlling the pressure of the air supplied to the carburetor of an aircraft engine. A pressure control system of the type described herein is disclosed and claimed broadly in the co-pending application of Hubert T. Sparrow, Serial No. 476,797, filed February 22, 1943. Certain features of the present invention are disclosed but not claimed in the sole Sparrow application.

Internal combustion engines used on aircraft are commonly provided with a compressor, usually termed a supercharger, which is driven by a turbine powered by the exhaust gases of the engine. The speed of the turbine, and hence the compression ratio of the compressor is controlled by a device termed a waste gate, which is a valve or damper which by-passes a part of the exhaust gases from the exhaust manifold directly to the atmosphere instead of directing them through the turbine.

In order to secure optimum operation of an engine, it is usually desirable to maintain the air pressure in the carburetor at a substantially constant value. This pressure may be varied by adjusting the position of the waste gate associated with the turbine which drives the supercharger.

In order to maintain the carburetor pressure substantially constant, it has been proposed to provide a control system which positions the waste gate in accordance with the pressure of the air at the carburetor. It is also desirable, for reasons of safety, to provide means responsive to the velocity of the turbine for additionally controlling the waste gate so as to limit the maximum velocity of the turbine. Furthermore, in order to prevent hunting or overshooting of the control system, it is desirable to provide means responsive to the acceleration of the turbine for introducing an additional control effect. It is therefore desirable to provide, in a control system for the waste gate of a supercharger, means whereby the system is responsive to the resultant of three controlling conditions, namely, the discharge air pressure, the acceleration of the turbine, and the velocity of the turbine.

It is an object of the present invention to provide an improved electrical system in which a controlled device is operated in accordance with the resultant of a plurality of controlling conditions.

Another object of the present invention is to provide an improved electrical system for controlling the pressure of the air supplied to the carburetor of an internal combustion engine.

Another object of the present invention is to provide, in an aircraft having a plurality of engines, means for controlling the pressure of the air supplied to the carburetor of each said engines, and means for simultaneously adjusting the pressure maintained by the control systems in all said engines.

Another object of our invention is to provide improved control apparatus, wherein each of a plurality of controlled devices is controlled in accordance with the departure from a predetermined value of a variable condition associated with that device, and wherein means is provided for simultaneously adjusting the positions of all said controlled devices at a given value of their associated controlling conditions.

Another object of the present invention is to provide, in an electrical system for controlling the waste gate of a supercharger, means to insure that the waste gate is moved to its open position upon the occurrence of an open circuit in the control system.

A further object of our invention is to provide an improved electrical control system for moving a device between a safe position and an active position, wherein means are provided for insuring that the device is moved to the safe position upon an opening of the control circuit.

Figure 1:
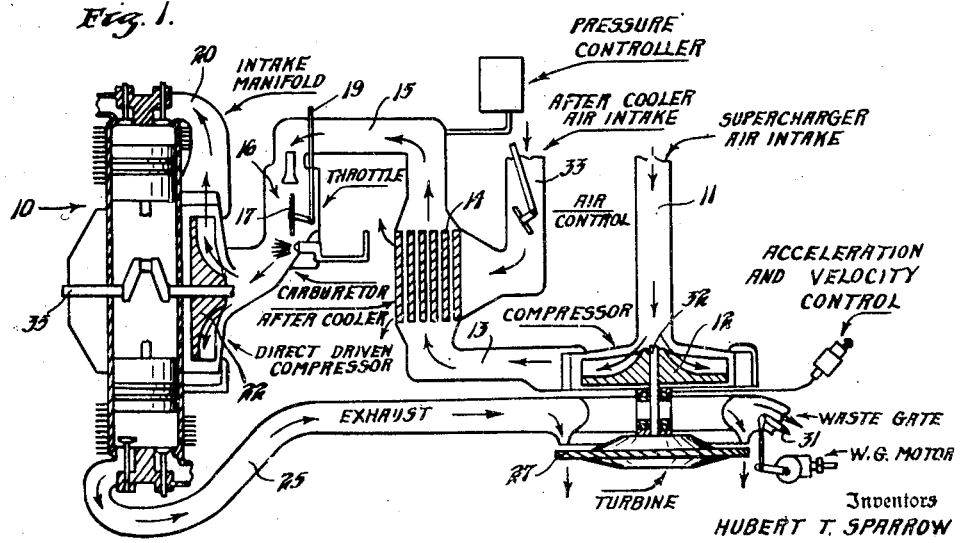

Other objects and advantages of the present invention will become apparent from a consideration of the appended specification, claims, and drawing, in which Figure 1 is a somewhat diagrammatic illustration of an internal combustion engine of a type commonly used on aircraft, together with its air induction and exhaust systems, Figure 2 is an electrical wiring diagram of a system for controlling the waste gate associated with the supercharger of Figure 1, and Figure 3 is a schematic diagram illustrating the application of the circuit of Figure 2 to an arrangement for simultaneously controlling the air pressure in the carburetors of all the engines of a multi-engined aircraft.

Referring to Figure 1, there is schematically shown an internal combustion engine 10 of a type generally used in aircraft. The air for supporting combustion in the engine 10 passes from an intake 11 through a compressor 12, a conduit 13, an after-cooler 14, a conduit 15, a carburetor 16 in which a throttle valve 17 is located, a direct driven compressor 22, and an intake manifold 20 to the engine 10.

The exhaust gases from the engine pass through an exhaust manifold 25 and a turbine 27. A waste gate 31 is provided, by means of which gases may be bled from the manifold 25 and permitted to pass directly to the outside air without passing through the turbine 27. The compressor 12 is driven by the turbine 27 through a shaft 32.

The after-cooler 14 is provided to reduce the temperature of the air leaving the compressor, wherein its temperature is increased due to the heat of compression. In the after-cooler, the compressed air received from the compressor passes in heat exchange relation with cooling air received from an intake 33, which after passing through the after-cooler is discharged.

In the carburetor 16, fuel from a supply not shown is mixed with the air. The throttle 17 may be positioned by operation of a lever 19.

The compressor 22 is directly driven by the engine 10 through the shaft 35. Such a direct driven compressor is usually geared up so that it rotates faster than the engine, and in many engines is utilized not only as a compressor but to distribute evenly the mixture of fuel and air to the various engine cylinders.

Referring now to Figure 2, it may be seen that the waste gate 31 is driven by a motor 200 through a gear train 201. The motor 200 is of the split phase type, being provided with a pair of field windings 202 and 203, which are spaced 90 electrical degrees apart, and an armature 204. The field winding 203 is supplied with electrical energy from a secondary winding 205 of a transformer 206. The energizing circuit for winding 203 may be traced from the upper terminal of secondary winding 205 through a conductor 207, a condenser 208, motor field winding 203, and a conductor 210 to the lower terminal of secondary winding 205.

The flow of electrical energy to the field winding 202 is controlled by an amplifier 211, which is connected to the winding 202 through a pair of conductors 212 and 213. The amplifier 211 is supplied with electrical energy from another secondary winding 214 on the transformer 206. The amplifier 211 is connected to the secondary winding 214 through a pair of conductors 215 and 216.

The amplifier 211 is provided with a pair of signal input terminals 220 and 221, and operates to supply the motor field winding 202 with alternating current of a phase dependent upon the phase of an alternating signal impressed upon the input terminals 220 and 221. Any suitable amplifier having such a characteristic may be used, but we prefer to use one of the type shown in Figure 1 of the co-pending application of Albert P. Upton, Serial No. 437,561, filed April 3, 1942, now Patent No. 2,423,534.

It will be seen that if the motor field winding 202 is supplied with alternating current which leads the current supplied to winding 203 by 90 electrical degrees, the motor 200 will rotate in one direction, while if the field winding 202 is supplied with current which lags the current in winding 203 by 90 electrical degrees, the motor 200 operates in the opposite direction.

The signal potential applied to the input terminals 220 and 221 of amplifier 211 is determined by the electrical conditions existing in a compound network, which consists of three electrical networks connected in series. The circuit between the amplifier input terminals 220 and 221 may be traced from terminal 220 through a conductor 222, a first electrical network 223, a conductor 224, a second electrical network 225, a conductor 226, a terminal 280, a third electrical network 227, a conductor 281, a terminal 279, and a conductor 228 to amplifier input terminal 221.

The network 227 includes a transformer secondary winding 230, across whose terminals is connected a slidewire resistance 231, by means of conductors 232 and 233. The conductor 281 is connected to a slider 234 which cooperates with resistance 231, and is movable therealong by operation of a knob 235. The slider 234 and the resistance 231 together comprise a control point adjuster 236 for the pressure control system.

Another resistance 229 has one of its terminals connected by a conductor 248 to the lower terminal of secondary winding 230, and its opposite terminal is connected through a conductor 249 to a center tap on secondary winding 230. A slider 218 cooperates with the slidewire resistance 229, and is manually adjustable with respect to that slidewire. Slider 218 and the resistance 229 together form a calibrating potentiometer 219.

The center tap on winding 230 is connected to the center of resistance 231 by a conductor 217. The conductor 217 is provided to decrease the impedance of the network between slider 234 and slider 218, and does not otherwise affect the operation of the system.

The electrical network 225 includes a secondary winding 237, across whose terminals a slidewire resistance 238 is connected by means of conductors 240 and 241. A slider 242 cooperates with resistance 238, and is connected to conductor 226. The slider 242 and resistance 238 together form a main controller 243. The main controller 243 is operated in accordance with the absolute pressure existing within the conduit 15. A pressure take-off duct 244 connects the carburetor intake pressure with the interior of a bellows 245. A second bellows 246 is evacuated, so that its expansion and contraction depends only upon atmospheric pressure. The two bellows 245 and 246 are mounted with their free ends extending toward each other, and those free ends are connected by a link 247. A center point on the link 247 is connected, as by a pin and slot connection, with the slider 242.

A second slidewire resistance 250 is also connected across the terminals of secondary winding 237, through conductors 251 and 252. A slider 253 cooperates with the resistance 250 and is connected to conductor 224. The resistance 250 and slider 253 together form an acceleration compensating controller 254. The controller 254 is operated in accordance with the acceleration of the turbine shaft 32 by an acceleration responsive control device schematically indicated at 255. A suitable acceleration responsive control device 255 is shown in detail in the sole Sparrow application, previously referred to. For the present purposes, it may be stated that the slider 253 is maintained in the position shown in the drawing as long as the shaft 32 rotates at a constant speed. Upon acceleration of the shaft 32, the slider 253 is moved to the right along resistance 250. A contact 282 provides a "dead spot" at the left end of resistance 250, so that small accelerations of the turbine 27 have no effect on the control system.

The network 223 includes a transformer secondary winding 260. A slidewire resistance 261 is connected by a conductor 262 to one terminal of secondary winding 260 and by a conductor 263 to a tap 283 at an intermediate point on secondary winding 260. A slider 264 cooperates with resistance 261 and is connected to conductor 224. The slider 264 and resistance 261 together form a velocity responsive compensating controller 265, which is operated by a velocity responsive control device schematically indicated at 266. A suitable device of this type is described in detail in the copending Sparrow application previously mentioned.

The network 223 also includes a slidewire resistance 267. The left terminal of resistance 267 is connected through a conductor 268 to a tap 284 spaced from tap 283 on secondary winding 260. The right terminal of resistance 267 is connected through a conductor 271 to the right terminal of secondary winding 260. A slider 272 cooperates with resistance 267, and is connected to conductor 222. The slider 272 and resistance 267 together form a follow-up potentiometer 273. The slider 272 is moved along resistance 267 by the motor 200, acting through the gear train 201, and concurrently with the movement of the waste gate 31.

A high resistance 286 is connected between conductor 271 and slider 272, for a purpose to be described later. Another high resistance 287 is connected between tap 284 and ground at 288.

All the secondary windings 230, 237 and 260 are on the same transformer, which may be the transformer 206, or a second transformer whose primary winding is connected to the same source as the primary winding 209 of transformer 206. As illustrated, the secondary windings 230, 237 and 260 are on the same transformer and are all shown in association with primary winding 209. Therefore, the alternating potentials at the terminals of these transformer windings are in phase with each other. The signal potential impressed on the input terminals 220 and 221 of amplifier 211 is therefore the algebraic sum of a number of potentials produced in the networks 223, 225 and 227.

Operation

For the sake of convenience in considering the operation of this circuit, let us consider only the potential condition existing during a half cycle when the terminals of the transformer windings have the polarity indicated by the legends in the drawing. In other words, the left-hand terminals of windings 237 and 260 are considered as positive, and the upper terminal of secondary winding 230 is considered as positive. In order to have a reference potential, the conductor 228 is considered as being grounded at 285.

Considering first the network 227, it will be seen that when the slider 234 is in the position shown in the drawing, it is above the center of resistance 231, and hence its potential is positive with respect to the center tap on winding 230. On the other hand, the slider 218 is at an intermediate point along the resistance 229, and hence its potential is negative with respect to the center tap on winding 230. It may therefore be seen that the network 227 introduces a potential into the series circuit connecting the amplifier input terminals, which potential is of a polarity such that the slider 218 and conductor 226 are made negative with respect to the grounded conductor 228.

Considering next the network 225, it will be seen that when the sliders 242 and 253 are in the positions shown in the drawing, the network 225 introduces into the series circuit a potential depending upon the potential of slider 242 with respect to the left terminal of secondary winding 237. This potential is of a polarity such that slider 253 is positive with respect to slider 242. The potential of slider 253 with respect to ground depends upon the relative magnitudes of the opposing potentials introduced by the networks 227 and 225. For the purposes of the present discussion, it may be assumed that the potential introduced by network 225 is larger than that introduced by network 227, and that hence slider 253 is positive with respect to ground.

Considering now the network 223, it will be seen that since slider 264 is at the extreme right end of its associated resistance 261, the conductor 263 is at the same positive potential with respect to ground as slider 253. The resistance 267 is connected across a portion of secondary winding 260 in such a manner that its left terminal is more positive than its right terminal. When the slider 272 is at the center position along resistance 267, then the network 223 introduces into the series circuit a potential which is the sum of the potential between taps 283 and 284 on winding 260 and the potential between slider 272 and the left terminal of resistance 267. The potential introduced by network 223 is of a polarity which makes slider 272 negative with respect to slider 264. If this negative potential is equal in magnitude to the positive potential of slider 264 with respect to ground, then the input terminal 220 is at the same potential as input terminal 221 of amplifier 211. Therefore, no energy is supplied to the field winding 202 of motor 200 by the amplifier 211 which is effective to cause rotation of motor 200. Accordingly, the waste gate remains stationary and the compound network, including the three networks 223, 225 and 227, remains balanced.

Consider now the operation of the system when the sliders 218, 234, 253 and 264 remain in the positions shown in the drawing, and the air pressure in the carburetor 16 increases. Such an increase in pressure at the carburetor 16 is transmitted to the bellows 245, where it causes slider 242 to move to the left along resistance 238. This reduces the magnitude of the positive potential introduced into the compound network by network 225. The positive potential in the compound network is then less than the sum of the negative potentials introduced by the networks 223 and 227, and hence the amplifier input terminal 220 becomes negative with respect to input terminal 221. Let it be assumed that the connections of the amplifier are such that when a signal potential of this phase is applied to the amplifier input terminals, the motor field winding 202 is supplied with alternating current of such a phase that the motor 200 is driven in the proper direction to move the waste gate towards open position. At the same time, operation of the motor 200 in this direction causes a movement of slider 272 to the left along resistance 267.

The opening movement of the waste gate 31 reduces the pressure differential across the turbine 27 and thereby reduces the speed of the compressor 12 driven by the turbine. The reduction in the speed of the compressor lowers its compression ratio, thereby reducing the pressure of the air supplied to the carburetor 16 and transmitted to the bellows 245. At the same time, the movement of slider 272 to the left along resistance 267 reduces the negative balancing potential introduced into the compound network. This movement of slider 272 and of the waste gate continues until the positive potential introduced by controller 243 is exactly balanced by the sum of the negative potentials introduced by the network 227 and the follow-up controller 273, whereupon the motor 200 stops.

In a similar manner, it may be understood that a decrease in the pressure in the carburetor 16 causes movement of slider 242 to the right along resistance 238, and thereby introduces into the compound series network a potential having a polarity such that it tends to make amplifier input terminal 220 positive with respect to input terminal 221. This causes operation of the motor 220 in a direction to close the waste gate and to move slider 272 to the right along resistance 267, thereby increasing the balancing potential provided by follow-up potentiometer 273, and at the same time increasing the pressure in the carburetor 16 to reduce the unbalancing potential due to the motion of slider 242.

Consider now the operation of the system when the sliders 218, 234, 242 and 264 remain in the positions shown in the drawing, and the slider 253 moves to the right along resistance 250 due to an excessive acceleration of the shaft 32. It will be seen that such a movement of slider 253 introduces into the series compound network a potential such that the input terminal 220 of amplifier 211 is rendered increasingly negative with respect to input terminal 221. As previously described, a signal potential having such polarity applied to the input terminals of amplifier 211 causes the waste gate to move towards open position, thereby reducing the speed of the turbine and compressor, and causing movement of slider 272 to the left to rebalance the compound network.

Considering the effect of movement of slider 264 to the left along resistance 261 at a time when the sliders 218, 234, 242 and 253 are stationary, it will be seen that such a motion of slider 264 introduces a potential into the series network which tends to make amplifier input terminal 220 negative with respect to input terminal 221. As before, such a signal potential causes a movement of the waste gate toward open position to reduce the speed of the turbine and compressor and a movement of slider 272 to the left to rebalance the control network.

There remains to be considered the effect of the network 227 on the operation of the control system. If the sliders 218, 242, 253 and 264 are stationary and at the positions shown in the drawing, and the slider 234 of the control point adjuster 236 is moved downwardly along resistance 231, the change in the potential introduced into the compound network is such as to make amplifier input terminal 220 positive with respect to terminal 221, thereby causing a closing movement of the waste gate and an increase in the intake manifold pressure. On the other hand, an upward movement of slider 234 from the position shown in the drawing makes amplifier input terminal 220 more negative than terminal 221, thereby causing operation of the waste gate toward open position and decreasing the pressure at the carburetor 16.

It may be desired to select any value of air pressure at the carburetor within a range of from 15" to 32" of mercury. This overall range of pressures is hereinafter termed the operating range. The main controller 243 is therefore designed to move from one end of its associated resistance to the opposite end as the carburetor pressure varies from 15" to 32" of mercury. After a particular value for the air pressure at the carburetor has been selected, it may be desired that the waste gate be operated throughout its range of movement as the manifold pressure varies over a range, for example, of 1" on either side of the selected pressure. This range of pressures is hereinafter termed the throttling range. The transformer secondary winding 237 which supplies potential to the terminals of resistance 238 is therefore proportioned with respect to the section of secondary winding 260 which supplies potential to the terminals of resistance 267, that a movement of slider 242 over a distance of ²/₁₇ of its total range of travel causes a following movement of slider 272 from one end of its range of movement to the other.

The network 227 is provided to shift the throttling range with respect to the operating range. If slider 234 is at the upper end of resistance 231, then the throttling range is from 15" to 17" of mercury. If the slider 234 is at the lower end of its resistance 231, then the throttling range of the system is from 30" to 32" of mercury. The calibrating potentiometer 219 is provided to adjust the terminal potential of network 227, so that the position of the pointer associated with knob 235 with respect to its cooperating scale may accurately indicate the relation between the pressure and the position of the waste gate in terms of the median value of the selected throttling range.

It may be seen that the network 227 may introduce into the series circuit between the amplifier input terminal a potential which is either positive or negative, depending upon relative positions of slider 234 and slider 218. During normal conditions, when the acceleration responsive slider 253 is in such a position as shown in the drawing, the network 225 introduces into the series circuit a potential whose polarity is always such as to make amplifier input terminal 220 positive with respect to ground. In the network 223, the section of secondary winding 260 between its left terminal and tap 283 is ineffective to introduce any potential into the series circuit when the velocity responsive slider 264 is at the position shown in the drawing, which is its normal position. The section of winding 260 between taps 283 and 284 is always connected in the series circuit and tends to introduce there a potential which opposes the potential introduced by network 225. The follow-up controller 273, which is connected across the right-hand section of secondary winding 260, also always introduces a potential into the series circuit which opposes that introduced by network 225. However, as explained above, this last mentioned potential is much smaller than the potential introduced by network 225, in order that the throttling range of the system may be much smaller than the operating range. The fixed potential introduced into the series circuit by the section of winding 260 between taps 283 and 284 is therefore provided to aid the network 227 and the follow-up controller 273 in balancing out the signal introduced by network 225, in order that the normal position of the slider 218 of calibrating potentiometer 219 may be somewhere near the center of its resistance 229. If such a fixed potential were not introduced into the series circuit, the normal position of slider 218 would be somewhere near the left end of resistance 229, and conditions would probably be encountered wherein the range of the slider 218 was not sufficient to calibrate the circuit properly.

The resistance 286 is provided to protect the system in case the slider 272 fails to properly contact the resistance 267. The resistance 286 is much higher than the resistance 267, and is normally ineffective as long as there is a proper contact between slider 272 and resistance 267. If because of dirt or other causes, the slider 272 fails to properly contact resistance 267, the negative potential at the right terminal of winding 260 is directly applied through resistance 286 to amplifier input terminal 220. As previously explained, a potential of this polarity applied to input terminal 220 causes the motor 200 to drive the waste gate toward its open position, which is its safe position, wherein the speeds of the turbine and supercharger are reduced to a minimum.

The resistance 287 is provided to protect the system against an opening of the series circuit at any point between tap 284 and conductor 228. Such an open circuit is most likely to occur at one of the sliders, because of dirt between the slider and its associated resistance. The resistance 287 is much higher than the impedance of the series circuit between tap 284 and ground, so that the resistance 287 is normally ineffective to produce any controlling action of the motor 200. Upon an opening of that portion of the series circuit connected in parallel with resistance 287, the input terminal 221 of amplifier 211 is connected through resistance 287 to tap 284, and the input terminal 220 is connected through slider 272 or through resistance 286 to a point of winding 260 which is negative with respect to tap 284. A potential is therefore applied to the amplifier circuit of a polarity which causes the waste gate to be driven toward its open position.

*Figure 3*

There is shown in Figure 3 an arrangement whereby the four engines of a multi-engine aircraft may be controlled by means of systems of the type shown in Figure 2. In Figure 3, those parts of the system which correspond to elements shown in Figure 2 have been given reference numerals in the 300 series which correspond to the reference numerals in Figure 2 in the 200 series. All of the control system of Figure 2 except the network 227 is enclosed by a dotted line 290, and in Figure 3 it is shown that this system is duplicated for each of the four engines, the duplicated control systems being schematically designated as 390A, 390B, and 390C and 390D.

In Figure 3, a single network 327 serves to adjust the control point and to calibrate all of the systems for the four engines. The network 327 is generally similar to the network 227 of Figure 2, except that four calibrating potentiometers are connected in parallel, where only one calibrating potentiometer was used in Figure 2. The sliders of the four calibrating potentiometers are connected into the respective series circuits of the four control systems. A single control point adjusting potentiometer 336 is connected into the series circuit of all the control systems, and thereby affects all of them. It may be seen that by adjusting each of the calibrating potentiometers of Figure 3 separately, the control system connected to the slider of that potentiometer may be calibrated with the control point adjuster 336.

While we have shown and described a preferred embodiment of our invention, other modifications thereof will occur to those skilled in the art, and we therefore wish to be limited only by the scope of the appended claims.

We claim as our invention:

1. Electrical control apparatus, comprising in combination, a load device to be driven between a first position and a second position, reversible motor means for driving said load device, means including an electronic amplifier responsive to electrical signal potentials for controlling the operation of said motor means, an electrical circuit for supplying signal potentials to said amplifier, said circuit comprising a plurality of networks connected in series to said amplifier, one of said networks comprising a transformer winding and means connecting at least a portion of said winding in said series circuit so that the potential introduced therein is of a phase to supply to said amplifier a signal potential to cause said motor means to drive said device to said first position, a pair of fixed impedances, means connecting each of said impedances between one terminal of said portion of said winding and a corresponding input terminal of said amplifier so as to be connected in parallel with the portion of said circuit between said terminal of said winding portion and said amplifier input terminal, each of said fixed impedances having a value high in comparison to the impedance of the portion of said circuit connected in parallel therewith, so that as long as said circuit portion is complete it controls the signal potential supplied to said amplifier, but upon opening of said circuit portion, the potential of said portion of said winding is transmitted through said impedance to said amplifier to cause said motor to drive said device to said first position.

2. Control apparatus for use on an aircraft having a plurality of internal combustion engines, each having an intake manifold, a compressor for supplying compressed air to said manifold, and driving means for said compressor, comprising: for each engine, means for controlling the compressing effect of said compressor, electrical motor means for driving said compressing effect controlling means, means including an electronic amplifier responsive to electrical signal potentials for controlling the flow of electrical energy to said motor means, a normally balanced electrical circuit for supplying signal potentials to said amplifier, said circuit comprising a plurality of networks connected in series, means for varying the terminal potential of one of said networks in accordance with the pressure of the air supplied to said intake manifold, and means for varying the terminal potential of one of said networks in accordance with the position of said compressing effect controlling means to balance said circuit so that said compressing effect controlling means tends to assume a position having a definite relationship to the pressure of the air supplied to said intake manifold; one of said networks being common to the series circuits for all of said engines; and manually operable means for varying the terminal potential of said common network to simultaneously change, in all of said engines, the relationship between said pressure and the position of said compressing effect controlling means.

3. Control apparatus for use on an aircraft having a plurality of internal combustion engines, each having an intake manifold, a compressor for supplying compressed air to said manifold, and driving means for said compressor comprising; for each engine, means for controlling the compressing effect of said compressor, electrical motor means for driving said compressing effect controlling means, means including an electronic amplifier responsive to electrical signal potentials for controlling the flow of electrical energy to said motor means, a normally balanced electrical circuit for supplying signal potentials to said amplifier, said circuit comprising a plurality of networks connected in series, means for varying the terminal potential of one of said networks in accordance with the pressure of the air supplied to said intake manifold, and means for varying the terminal potential of one of said networks in accordance with the position of said compressing effect controlling means to balance said circuit so that said compressing effect controlling means tends to assume a position having a definite relationship to the pressure of the air supplied to said intake manifold; one of said networks being common to the series circuits for all of said engines; manually operable means for varying the terminal potential of said common network to simultaneously change, in all of said engines, the relationship between said pressure and the position of said compressing effect controlling means; and means for connecting said common network to each of said series circuits, each said connecting means including manually operable means to change the potential supplied from said common network to each series circuit without affecting the potential supplied therefrom to the other series circuits.

4. Electrical control apparatus, comprising in combination, a plurality of load devices to be positioned, motor means for driving each of said load devices, electrical circuit means associated with each of said motor means, means connected in each of said circuit means for varying an electrical quantity therein in accordance with a condition indicative of the need for operation of the load device associated with said circuit means, means responsive to a change in the value of said quantity for controlling said motor means, means driven by said motor means for restoring said electrical quantity to its original value, an electrical network comprising a transformer winding, an electrical resistance connected across said winding, a contact movable along said resistance, means electrically connecting said contact to all said circuit means, a plurality of additional resistances, equal in number to said circuit means, connected in parallel across at least a portion of said winding, a contact movable along each of said additional resistances, and means connecting each of said last-mentioned contacts to one of said circuit means so as to enable individual adjustment of any one of said circuit means independently of the said condition responsive quantity varying means associated with said circuit means.

5. Electrical control apparatus, comprising in combination, a load device to be driven between a first position and a second position, motor means for driving said load device, electrical circuit means including means for varying an electrical potential therein in accordance with a condition indicative of the need for operation of said load device and means responsive to said potential for controlling said motor means, said circuit means including one portion normally having a potential thereacross such as to tend to cause said motor means to drive said device to said first position and a second portion normally having a potential thereacross counteracting said tendency of said first portion, and a fixed impedance connected in parallel with said second portion, said fixed impedance being high in comparison to that of said second portion so that when the circuit through said second portion is complete the potential across said first portion is normally counteracted but when the circuit through said second portion is open, the potential across said first portion is impressed on said potential responsive means through said impedance to cause said motor means to drive said load device to said first position.

6. Electrical control apparatus, comprising in combination, a load device to be driven between a first position and a second position, motor means for driving said load device, electrical circuit means including means for varying an electrical potential therein in accordance with a condition indicative of the need for operation of said load device and means responsive to said potential for controlling said motor means, said circuit means including three portions, a first of which normally has a potential thereacross such as to tend to cause said motor means to drive said device to said first position and the other two of which normally have potentials thereacross counteracting said tendency of said first portion, and a pair of fixed impedances each of which is connected in parallel with one of said other two portions, said fixed impedances each being high in comparison to that of the portion of the circuit means with which it is connected in parallel so that when the circuit through said two portions is complete the potential of said first portion is normally counteracted but when the circuit through either of said other two portions is open, the potential of said first portion is impressed on said potential responsive means through said impedance to overcome the effect of the potential of the other of said two portions to cause said motor means to drive said load device to said first position.

7. In motor control apparatus; motor means; an electrical circuit means; said circuit means comprising at least one impedance network and having a condition of balance dependent upon the unbalance voltage of said network; and means operatively connected to said circuit means and said motor means and responsive to the unbalance of said circuit means for controlling said motor means; said network including an electrically continuous source of power, a first voltage divider connected across a first portion of said source of power, and a second voltage divider connected across a second portion of said source of power, each of said voltage dividers comprising impedance means having an intermediate terminal the impedance between which and at least one point of connection of said impedance means to said source of power is variable, said intermediate terminals of said first and second voltage dividers constituting the output terminals of said network, and said first and second portions of said source of power being spaced from each other by an intermediate portion introducing a fixed amount of unbalance into said circuit means.

8. In motor control apparatus; motor means; an electrical circuit means; said circuit means comprising at least one impedance network and having a condition of balance dependent upon the unbalance voltage of said network; and means operatively connected to said circuit means and said motor means and responsive to the direction and extent of unbalance of said circuit means for controlling said motor means; said network including a transformer having a secondary winding, a first voltage divider connected across a first portion of said secondary winding, and a second voltage divider connected across a second portion of said secondary winding, each of said voltage dividers comprising impedance means having an intermediate terminal the impedance between which and at least one point of connection of said impedance means to said secondary winding is variable, said intermediate terminals of said first and second voltage dividers constituting the output terminals of said network, and said first and second portions of said secondary winding being spaced from each other by an intermediate portion introducing a fixed amount of unbalance into said circuit means.

9. In motor control apparatus; motor means; an electrical circuit means; said circuit means comprising a plurality of series connected impedance networks each including a source of power and variable impedance means connected across at least a portion of said source of power, said circuit means having a condition of balance dependent upon the conditions of the variable impedance means in said networks; and means operatively connected to said circuit means and said motor means and responsive to the unbalance of said circuit means for controlling said motor means; one of said networks including a variable impedance means normally in such a condition as to cause said network to be permanently unbalanced; and another of said networks including first and second voltage dividers connected across first and second portions, respectively, of the source of power of the network, each of said voltage dividers comprising impedance means having an intermediate terminal the impedance between which and at least one point of connection of said impedance means to said source of power is variable, said intermediate terminals of said first and second voltage dividers constituting the output terminals of said network, and said first and second portions of said source of power being spaced from each other by an intermediate portion introducing a fixed amount of unbalance into said circuit means to counteract the normally unbalanced condition of said first named network.

HUBERT T. SPARROW.
ROBERT J. KUTZLER.

REFERENCES CITED

The following references are of record in the file of this patent:

UNITED STATES PATENTS

| Number | Name | Date |
| --- | --- | --- |
| 1,281,995 | Moss | Oct. 15, 1918 |
| 1,346,563 | Sherbondy | July 13, 1920 |
| 1,346,564 | Sherbondy | July 13, 1920 |
| 1,557,793 | Berger et al. | Oct. 20, 1925 |
| 1,612,053 | Restany | Dec. 28, 1926 |
| 1,706,968 | Schleicher et al. | Mar. 26, 1929 |
| 1,816,737 | Moss | July 28, 1931 |
| 1,816,787 | Moss | July 28, 1931 |
| 2,199,259 | Hersey | Apr. 30, 1940 |
| 2,210,325 | Newton | Aug. 6, 1940 |
| 2,232,077 | Rosecky | Feb. 18, 1941 |
| 2,340,126 | Jones | Jan. 25, 1944 |
| 2,390,793 | Jones | Dec. 11, 1945 |

FOREIGN PATENTS

| Number | Country | Date |
| --- | --- | --- |
| 504,591 | Germany | Aug. 6, 1930 |
| 761,746 | France | Mar. 26, 1934 |